United States Patent
Kundmann et al.

(10) Patent No.: US 10,615,828 B2
(45) Date of Patent: *Apr. 7, 2020

(54) FLEXIBLE MULTI-CHANNEL WIRELESS AUDIO RECEIVER SYSTEM

(71) Applicant: Shure Acquisition Holdings, Inc., Niles, IL (US)

(72) Inventors: Thomas J. Kundmann, Oakwood Hills, IL (US); Michael Goodson, Union, IL (US); Robert Mamola, Oak Park, IL (US); Jeffrey Arthur Meunier, Deerfield, IL (US); Robert Szopko, Downers Grove, IL (US); Yang Tang, Wilmette, IL (US)

(73) Assignee: Shure Acquisition Holdings, Inc., Niles, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/289,002

(22) Filed: Feb. 28, 2019

(65) Prior Publication Data

US 2019/0372612 A1    Dec. 5, 2019

Related U.S. Application Data

(60) Continuation of application No. 16/118,039, filed on Aug. 30, 2018, now Pat. No. 10,230,412, which is a division of application No. 15/783,890, filed on Oct. 13, 2017, now Pat. No. 10,069,525, which is a continuation of application No. 15/605,497, filed on
(Continued)

(51) Int. Cl.
*H04B 1/10* (2006.01)
*H04B 1/16* (2006.01)
*H04B 7/08* (2006.01)

(52) U.S. Cl.
CPC ............. *H04B 1/1027* (2013.01); *H04B 1/16* (2013.01); *H04B 7/08* (2013.01)

(58) Field of Classification Search
CPC ........... H04B 1/1027; H04B 1/16; H04B 7/08
See application file for complete search history.

(56) References Cited

U.S. PATENT DOCUMENTS 6,363,263 B1    3/2002   Reudnik
6,802,044 B2   10/2004   Campbell
(Continued)

OTHER PUBLICATIONS

Invitation to Pay Additional Fees for PCT/US2016/050069 dated Nov. 25, 2016 (7 pp.).

*Primary Examiner* — Nguyen T Vo
(74) *Attorney, Agent, or Firm* — William J. Lenz, Esq.; Neal, Gerber & Eisenberg LLP (57) ABSTRACT

A flexible multi-channel diversity wireless audio receiver system for routing, processing, and combining multiple radio frequency (RF) signals containing audio signals received on respective antennas is provided. The wireless audio receiver system provides flexible routing of multiple RF signals in different selectable modes, and low latency uninterrupted reception of signals in harsh RF environments by combining multiple RF signals to maximize signal-to-noise ratio. The audio output may be generated in an uninterrupted fashion and mitigate multipath fading, interference, and asymmetrical noise issues. Received RF signals may also be cascaded by the wireless audio receiver system to allow daisy chaining.

14 Claims, 7 Drawing Sheets

Related U.S. Application Data

May 25, 2017, now Pat. No. 9,793,936, which is a division of application No. 14/846,373, filed on Sep. 4, 2015, now Pat. No. 9,667,285.

(56) References Cited

U.S. PATENT DOCUMENTS

| | | | |
|---|---|---|---|
| 8,913,701 B2 | 12/2014 | Seely | |
| 8,936,405 B2 | 1/2015 | Tamura | |
| 9,667,285 B2 * | 5/2017 | Kundmann | .......... H04B 1/1027 |
| 9,793,936 B2 | 10/2017 | Kundmann | |
| 2002/0178454 A1 | 11/2002 | Antoine | |
| 2008/0069052 A1 | 3/2008 | Mezer | |
| 2010/0266062 A1 | 10/2010 | Mussmann | |
| 2011/0022204 A1 * | 1/2011 | Hatfield | .............. H04M 1/6025 |
| | | | 700/94 |
| 2013/0016647 A1 | 1/2013 | Marco | |
| 2016/0344578 A1 | 11/2016 | Mitchell | |

* cited by examiner

FLEXIBLE MULTI-CHANNEL WIRELESS AUDIO RECEIVER SYSTEM

CROSS-REFERENCE TO RELATED APPLICATIONS

This application is a continuation of U.S. patent application Ser. No. 16/118,039, filed on Aug. 30, 2018, which is a divisional of U.S. patent application Ser. No. 15/783,890, now U.S. Pat. No. 10,069,525, filed on Oct. 13, 2017, which is a continuation of U.S. patent application Ser. No. 15/605,497, now U.S. Pat. No. 9,793,936, filed on May 25, 2017, which is a divisional of U.S. patent application Ser. No. 14/846,373, now U.S. Pat. No. 9,667,285, filed on Sep. 4, 2015, all of which are fully incorporated herein by reference.

TECHNICAL FIELD

This application generally relates to a flexible multi-channel wireless audio receiver system. In particular, this application relates to a multi-channel diversity wireless audio receiver system for routing, filtering, processing, and combining multiple radio frequency (RF) signals containing audio signals received on respective antennas.

BACKGROUND

Audio production can involve the use of many components, including microphones, wireless audio transmitters, wireless audio receivers, recorders, and/or mixers for capturing, recording, and presenting the sound of productions, such as television programs, newscasts, movies, live events, and other types of productions. The microphones typically capture the sound of the production, which is wirelessly transmitted from the microphones and/or the wireless audio transmitters to the wireless audio receivers. The wireless audio receivers can be connected to a recorder and/or a mixer for recording and/or mixing the sound by a crew member, such as a production sound mixer. Electronic devices, such as computers and smartphones, may be connected to the recorder and/or mixer to allow the crew member to monitor audio levels and timecodes.

Wireless audio transmitters, wireless audio receivers, wireless microphones, and other portable wireless communication devices include antennas for transmitting and receiving radio frequency (RF) signals which contain digital or analog signals, such as modulated audio signals, data signals, and/or control signals. Users of portable wireless communication devices include stage performers, singers, actors, news reporters, and the like.

A wireless audio transmitter may transmit an RF signal that includes an audio signal to a wireless audio receiver. The wireless audio transmitter may be included in a wireless handheld microphone, for example, that is held by the user and includes an integrated transmitter and antenna. When the RF signal is received at the wireless audio receiver, the RF signal may be degraded due to multipath fading caused by constructive interference and/or by other types of interference. This degradation may cause the RF signal to have a poor signal-to-noise ratio (SNR), which can result in bit errors that can cause audio artifacts and muting of the resulting output audio. However, muting the output audio is undesirable in many situations and environments, such as during professional stage productions and concerts. The effects of such multipath fading and interference are most prevalent in harsh RF environments where physical and electrical factors influence the transmission and reception of RF signals, e.g., movement of the microphone within the environment, other RF signals, operation in large venues, etc.

To alleviate issues with multipath fading of RF signals, wireless audio components may utilize frequency diversity and/or antenna diversity techniques. In particular, wireless audio transmitters may utilize frequency diversity to simultaneously transmit on one antenna two RF signals of two separate frequencies in a combined RF signal, where the two RF signals both include the same audio signal. A wireless audio receiver may then use one or both of the underlying RF signals. In addition, wireless audio receivers may utilize antenna diversity to simultaneously receive RF signals from a wireless audio transmitter on multiple antennas. The received RF signals can be combined to produce a single audio output.

In some cases, a two antenna system may not be sufficient to provide adequate performance. More than two antennas may be desired in order to benefit from the user of antennas with different directional gains so that the coverage of the wireless system is extended. For example, a particular venue may have multiple "zones" that need to be covered by a single wireless receiver and/or a venue may be very large. In these situations, having more than two antenna locations may result in improved coverage and reduced transmitter to antenna distances. As such, a traditional two antenna diversity may not provide adequate performance.

When utilizing frequency diversity and/or antenna diversity techniques, existing wireless audio receivers typically combine multiple RF signals received on multiple antennas by scaling each RF signal proportionally using maximal-ratio combining (MRC) under the assumption that there is equal noise power in each RF signal. However, if the antennas are subjected to asymmetrical noise, e.g., when one antenna is closer to a source of interference, then MRC does not maximize the signal-to-noise ratio of the combined signal. This can cause the receiver to produce non-optimal audio output, such as degraded sound or muting. In addition, existing wireless audio receivers may need additional components and complex arrangements in certain situations and environments. For example, if more than two antennas are utilized, external antennas combiners and external switches may be needed.

Accordingly, there is an opportunity for a multi-channel wireless audio receiver system that addresses these concerns. More particularly, there is an opportunity for a multi-channel diversity wireless audio receiver system that provides flexible routing of multiple RF signals in different selectable modes, and low latency uninterrupted reception of signals in harsh RF environments by combining multiple RF signals to maximize signal-to-noise ratio. Furthermore, there is an opportunity for a multi-channel diversity wireless audio receiver system that provides performance benefits when high-order modulation scheme (such as 16-QAM and 64-QAM) are utilized that have higher RF sign-to-noise ratio requirements.

SUMMARY

The invention is intended to solve the above-noted problems by providing multi-channel wireless audio receiver systems and methods that are designed to, among other things: (1) flexibly route multiple RF signals to different RF analog processing modules in different selectable modes; (2) maximize the SNR of a combined signal by combining multiple RF signals by scaling them proportionally to their respective SNR; (3) cascade received RF signals to allow daisy chaining of receivers; (4) enable the allocation of additional, redundant channels of RF processing to additional antenna inputs for mission critical audio sources; and (5) enable the allocation of fewer RF processing channels to a given audio channel to maximize the number of audio channels that can be decoded.

In an embodiment, a wireless audio receiver includes a mode selection interface for enabling a user to select one of a plurality of modes of the wireless audio receiver; a plurality of radio frequency (RF) ports each configured to receive a plurality of RF signals from a respective antenna, wherein each of the plurality of RF signals comprises one or more audio signal; and an antenna distribution module in communication with the plurality of RF ports. The antenna distribution module may be configured to when in a first mode, route the plurality of RF signals to one or more of a plurality of downstream processing components; and when in a second mode, route a first subset of the plurality of RF signals to be output on a first subset of the plurality of RF ports and route a second subset of the plurality of RF signals to one or more of the plurality of downstream processing components.

In another embodiment, a wireless audio receiver includes a first plurality of radio frequency (RF) ports each configured to receive a first plurality of RF signals from a respective antenna; a second plurality of RF ports each configured to receive a second plurality of RF signals from a respective antenna and further configured to output one of the first plurality of RF signals based on a mode of the wireless audio receiver, wherein each of the first and second pluralities of RF signals comprises one or more audio signals; a first plurality of antenna distribution modules each associated with each of the first plurality of RF ports; and a second plurality of antenna distribution modules each associated with each of the second plurality of RF ports. The first plurality of antenna distribution modules may each include a first splitter in communication with one of the first plurality of RF ports, the first splitter for splitting one of the first plurality of RF signals into a first plurality of split RF signals, wherein the first plurality of split RF signals are routed to one or more of a plurality of downstream processing components, a first switch, and a second switch; and the first switch in communication with the first splitter and one or more of the plurality of downstream processing components, the first switch for switching between one of the first plurality of split RF signals and one of a second plurality of split RF signals. The second plurality of antenna distribution modules may each include the second switch in communication with one of the second plurality of RF ports and the first splitter, the second switch for switching between one of the first plurality of split RF signals and one of the second plurality of RF signals; and a second splitter in communication with the first switch and the second switch, the second splitter for splitting one of the second plurality of RF signals into a second plurality of split RF signals, wherein the second plurality of split RF signals are routed to the first switch.

In a further embodiment, a method of combining a plurality of digital modulated signals (y) based on a signal-to-noise ratio (SNR) of each of the plurality of digital modulated signals is described. The plurality of digital modulated signals may be respectively derived from a plurality of received radio frequency (RF) signals each comprising a digital audio bit stream representing an audio signal. The method may include deriving a channel estimate (h) of each of the plurality of digital modulated signals; measuring a normalized noise power ($\sigma^2$) of each of the plurality of digital modulated signals; deriving a normalized received signal based on the channel estimate; and combining the plurality of digital modulated signals to produce a combined modulated signal based on the normalized noise power and the normalized received signal.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

The description that follows describes, illustrates and exemplifies one or more particular embodiments of the invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

The flexible multi-channel wireless audio receiver system described herein can flexibly route multiple received RF signals to different RF analog processing modules in various selectable modes, and combine the multiple received RF signals into a combined signal with maximized SNR, while processing the signals with low latency to generate an output audio signal in an uninterrupted fashion. The receiver may further eliminate the need for external antennas combiners and manual switching between multiple antennas while being housed in a single receiver form factor. In particular, the receiver may have a variety of different modes that allow different numbers of antennas to be used, depending on the desired application and environment the receiver is being used in.

For example, in one scenario, the receiver may be connected to four antennas that cover the same space (e.g., a large stage or venue) for improved coverage. In another scenario, the receiver may be connected to two pairs of antennas, where each pair of antennas covers a different space (e.g., two parts of the venue that can be divided), such that peripheral spaces like backstage or dressing rooms are also covered. In a further scenario, the receiver may be connected to additional antennas to allow coverage of irregularly-shaped performance areas (e.g., jutting/thrusting stages or venues with secondary stages) where optimal coverage with a single pair of antennas is not possible. In another scenario, the receiver may be connected to multiple pairs of antennas to be deployed as "cold backups" for use when a performance issue is identified. Typically, in this case, a skilled operator must manually detect the issue and intervene to engage the "cold backups". However, the receiver described herein can make use of the "cold backup" antennas in a dynamic and automated manner.

Figure 1:
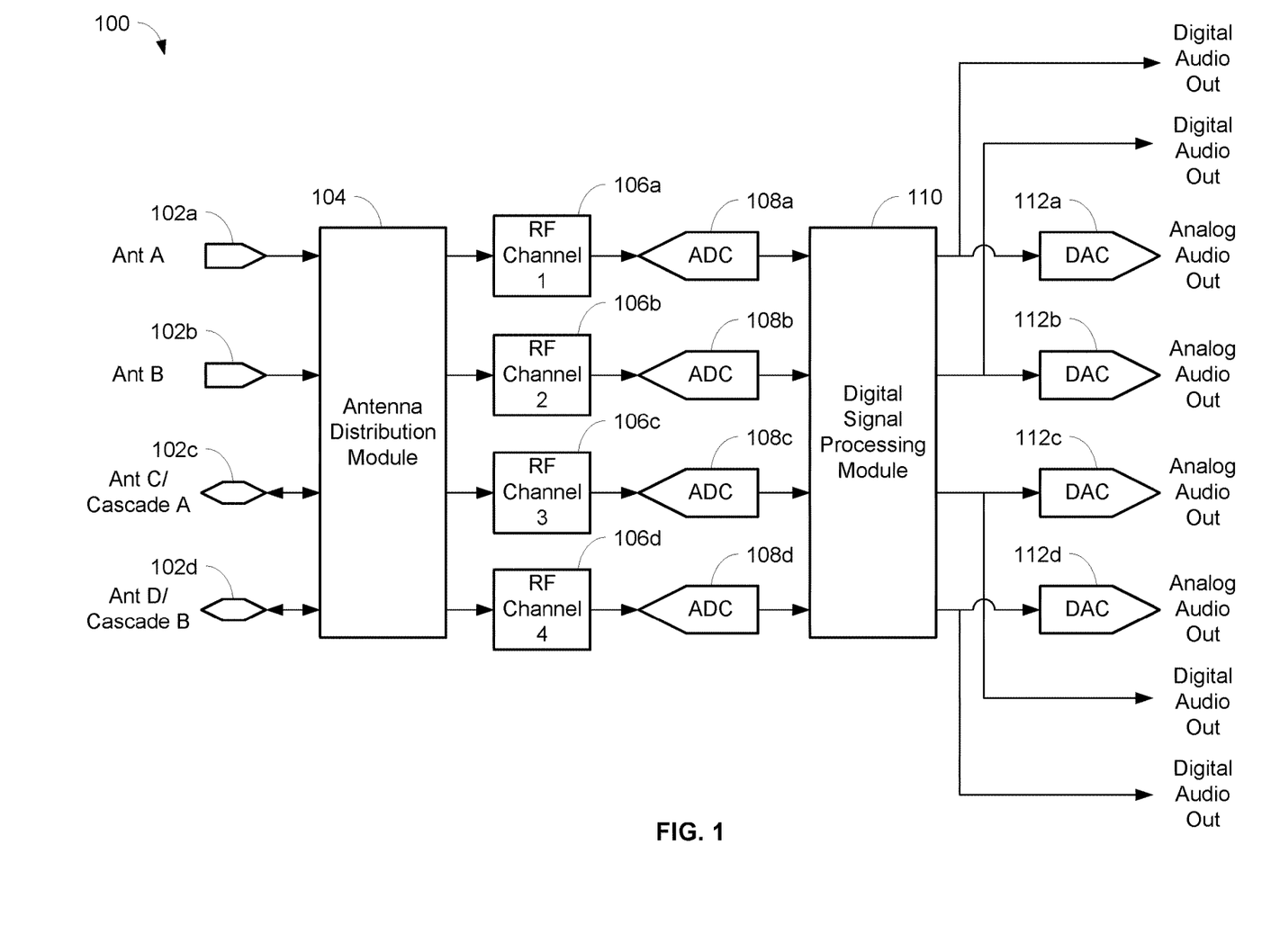
FIG. 1 is a schematic diagram of a wireless audio receiver system, in accordance with some embodiments.

FIG. 1 is a schematic diagram of a wireless audio receiver 100 for receiving one or more radio frequency (RF) signals containing digital audio bit streams that represent audio signals. The receiver 100 may include multiple RF ports 102a-d that can be connected to respective antennas to receive RF signals. The RF ports 102a-d may include a subset of ports that can be configured to be used for cascading purposes to daisy chain the receiver 100 to other wireless receivers. In particular, as seen in FIG. 1, the RF ports 102a, 102b (labeled Ant A and Ant B, respectively) are configured to be connected to separate antennas (not shown) that each receive an RF signal. The RF ports 102c, 102d (labeled Ant C/Cascade A and Ant D/Cascade B, respectively) can be configured to be connected to separate antennas (not shown) that each receive an RF signal as well, or the RF ports 102c, 102d can be configured to output the RF signals received on the RF ports 102a, 102b, respectively. As such, the RF ports 102a-d of the receiver 100 can be connected to two, three, or four antennas, depending on the needs of a user. It should be noted that although FIG. 1 shows four ports 102a-d for connecting up to four antennas, the receiver 100 is extensible to more than four ports and antennas. Various components included in the wireless audio receiver 100 may be implemented using software executable by one or more servers or computers, such as a computing device with a processor and memory, and/or by hardware (e.g., discrete logic circuits, application specific integrated circuits (ASIC), programmable gate arrays (PGA), field programmable gate arrays (FPGA), etc.

The RF signals may be received at the receiver 100 from a wireless audio transmitter and/or a microphone, for example, that has captured the sound of a production or other audio source. A user may select various modes of the receiver 100 depending on how many antennas are connected to the ports 102a-d and may denote the number of RF signals being received. The selected mode of the receiver 100 may determine how the received RF signals are switched by an antenna distribution module 104, as described below. The modes of the receiver 100 may include being able to select how many ports 102a-d are utilized and being able to select whether the received RF signals have utilized frequency diversity or antenna diversity.

One mode of the receiver 100 includes being able to select whether several of the RF ports (e.g., RF ports 102c, 102d) are used to output incoming RF signals to other receiver(s), also known as cascade mode. In this mode, multiple RF signals (including audio signals) that have been transmitted may be received and processed by the receiver 100 and are also output to other receivers for daisy chaining purposes. For example, two ports (e.g., RF ports 102a, 102b) may be respectively connected to two antennas to receive four transmitted RF signals each including an audio signal from a single audio source. The four RF signals may have been transmitted using frequency diversity on four different frequencies. One audio output signal may be generated in this case by combining the four received RF signals. As another example, two ports (e.g., RF ports 102a, 102b) may be respectively connected to two antennas to receive a single transmitted RF signal including an audio signal from a single audio source. The single transmitted RF signal may be received by the two antennas of the receiver 100 to take advantage of antenna diversity. One audio output signal may be generated in this case by combining the RF signal received on the two antennas.

Another mode of the receiver 100 includes being able to select whether several of the RF ports (e.g., RF ports 102c, 102d) are connected to more antennas (e.g., antennas Ant C/Cascade A and Ant D/Cascade B), rather than being output as in the cascade mode described above. In this mode, fewer audio channels that have been transmitted may be received by the receiver 100 but these audio channels may be processed by redundant RF analog processing modules 106a-d. For example, four ports (e.g., RF ports 102a-d) may be respectively connected to four antennas to receive a single transmitted RF signal including an audio signal from a single audio source. The single transmitted RF signal may be received by the four antennas of the receiver 100 to take advantage of antenna diversity. One audio output signal may be generated in this case by combining the RF signal received on the four antennas. As another example, four ports (e.g., RF ports 102a-d) may be respectively connected to four antennas to receive two transmitted RF signals, where each transmitted RF signal has been transmitted at different frequencies and includes a unique audio signal from a unique audio source. In this example, two audio output signals may be generated by respectively combining the RF signals received on the four antennas. Four of the RF signal processing paths (described further below) may be utilized and combined to create one of the audio output signals, while the other four RF signal processing paths may be utilized and combined to create the other audio output signal. As a further example, four ports (e.g., RF ports 102a-d) may be respectively connected to four antennas to receive two transmitted RF signals each including an audio signal from a single audio source. The two RF signals may have been transmitted using frequency diversity on two different frequencies. One audio output signal may be generated in this case by combining the two received RF signals. All of the RF signal processing paths 302a, 302b, 304a, 304b, 306a, 306b, 308a, 308b (described further below) may be utilized and combined to create the one audio output signal.

In certain modes, the receiver 100 includes an antenna distribution module 104 that can flexibly route the RF signals received on the RF ports 102a-d to RF analog processing modules 106a-d (denoted in FIG. 1 as RF Channels 1-4). In addition, if the receiver 100 is being used in a cascade mode for daisy chaining to another receiver, the antenna distribution module 104 can take the RF signals received on RF ports 102a, 102b (Ant A and Ant B), route the RF signals to RF analog processing modules 106a-d (RF Channels 1-4), and also route the RF signals to be output on RF ports 102c, 102d (Ant C/Cascade A and Ant D/Cascade B). The antenna distribution module 104 may also process the received RF signals prior to routing the RF signals to the RF analog processing modules 106a-d and/or to the RF ports 102c, 102d. Further details of the antenna distribution module 104 are described below with respect to FIG. 2.

The RF analog processing modules 106a-d may receive the routed RF signals from the antenna distribution module 104 and generate analog modulated signals that have been shifted to an intermediate frequency (IF). Each RF analog processing modules 106a-d may include two parallel RF signal processing paths for processing the routed RF signals, as described in more detail with respect to FIG. 3.

The analog modulated signals may be converted to digital modulated signals by analog to digital converters (ADC) 108a-d. The digital modulated signals may be received by a digital signal processing (DSP) module 110 and demodulated to generate up to four digital audio signals that can be output from the receiver 100. Digital to analog converters (DAC) 112a-d may also convert the digital audio signals to respective analog audio signals to be output from the receiver 100. In embodiments, the DSP module 110 may combine the digital modulated signals from the ADCs 108a-d into a combined modulated signal, based on the signal-to-noise ratios (SNR) of the digital modulated signals. In particular, the digital modulated signals may be scaled proportionally to their respective SNR so that the SNR of the combined modulated signal is maximized. The DSP module 110 may further demodulate the combined modulated signal into a single combined digital audio signal. The combined digital audio signal may be output on any of the digital audio outputs. Further details of how the DSP module 110 can combine the digital modulated signals are described below with respect to FIGS. 5 and 6. The DSP module 110 may further include an audio signal processing module to further process the digital audio signals prior to being output from the receiver 100.

The digital audio signals output by the receiver 100, including the combined digital audio signal, may conform to the Audio Engineering Society AES3 standard, Dante standard, and/or AVB/AVNU standard for transmitting audio over Ethernet, for example. Moreover, the receiver 100 may output the digital audio signals on an XLR connector output, on an Ethernet port, or on other suitable types of outputs. The analog audio signals may be output by the receiver 100 on an XLR connector output, a ¼" audio output, and/or other suitable types of outputs.

The receiver 100 may be rack mountable, and may include a display for displaying various information, full audio meters, and RF signal strength indicators, and may further include control switches, buttons, and the like for user control and setting of configuration options. The RF ports 102a-d may be BNC, SMA (SubMiniature version A) coaxial connectors, N-type, or other suitable connectors for connecting to external antennas and/or cabling.

Figure 2:
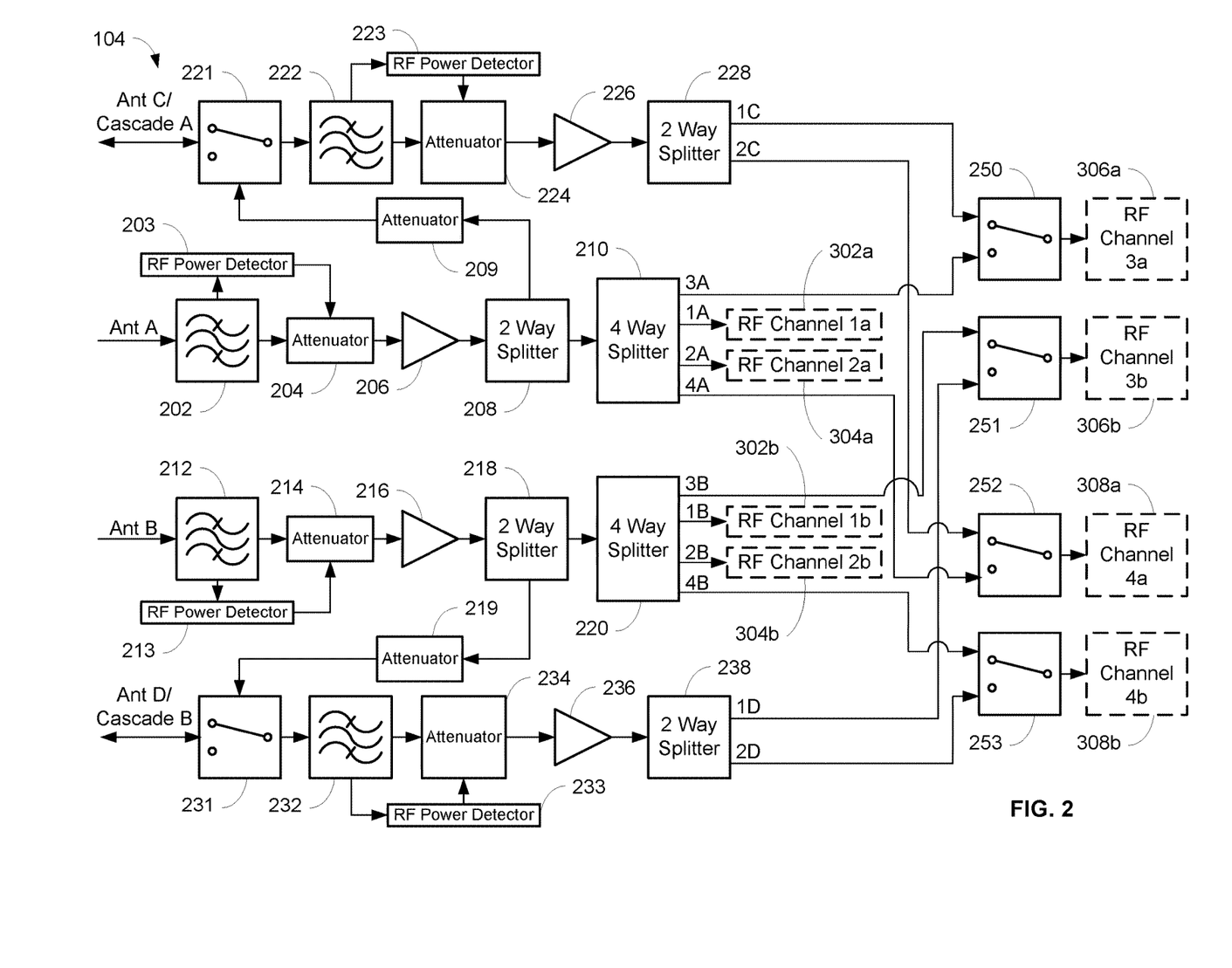
FIG. 2 is a schematic diagram of an antenna distribution module for use in the wireless audio receiver system of FIG. 1, in accordance with some embodiments.

FIG. 2 is a schematic diagram of an antenna distribution module 104 of the wireless audio receiver 100 of FIG. 1. The antenna distribution module 104 may receive RF signals from antennas connected to the RF ports 102a-d and selectively route the received RF signals to RF analog processing modules 106a-d, and in particular to RF signal processing paths 302a, 302b, 304a, 304b, 306a, 306b, 308a, 308b within the RF analog processing modules 106a-d. The RF signal processing paths 302a, 302b, 304a, 304b, 306a, 306b, 308a, 308b are denoted in FIGS. 2-3 as RF Channels 1a, 1b, 2a, 2b, 3a, 3b, 4a, 4b, respectively, and are shown with dotted lines in FIG. 2 because they are not components of the antenna distribution module 104. Instead, the RF signal processing paths are shown in FIG. 2 to denote where the antenna distribution module 104 may route the received RF signals, depending on the mode of the receiver 100. In a cascade mode of the receiver 100, the antenna distribution module may receive RF signals from antennas connected to the RF ports 102a, 102b, route the received RF signals to RF analog processing paths 302a, 302b, 304a, 304b, 306a, 306b, 308a, 308b (RF Channels 1a, 1b, 2a, 2b, 3a, 3b, 4a, 4b), and also route the received RF signals to be output on RF ports 102c, 102d (Ant C/Cascade A and Ant D/Cascade B), respectively.

As shown in FIG. 2, the antenna distribution module 104 includes components to process and route each of the received RF signals. The processing paths of the antenna distribution module 104 are similar for each of the received RF signals except that RF ports 102c, 102d (Ant C/Cascade A and Ant D/Cascade B) are connected to switches 221, 231 to support the output of RF signals from RF ports 102a, 102b in a cascade mode of the receiver 100. In a non-cascade mode of the receiver 100, up to four antennas may be connected to the RF ports 102a-d to receive four RF signals.

When in non-cascade mode, the RF signals received on RF ports 102a-d (Ant A-D) may be bandpass filtered by bandpass filters 202, 212, 222, 232, respectively, to generate filtered RF signals such that the appropriate frequency bands of the received RF signals are selected. For example, the bandpass filters 202, 212, 222, 232 may pass a signal band from 470-636 MHz, 606-801 MHz, 750-952 MHz, and/or other signal band ranges. In the case of the RF signals received on RF ports 102c, 102d (Ant C and Ant D), the switches 221, 231 may be configured such that the received RF signals are passed through to the bandpass filters 222, 232, respectively, when the receiver 100 is in a non-cascade mode. The filtered RF signals may be received by attenuators 204, 214, 224, 234 that adjust the gain of the filtered RF signals to produce attenuated filtered RF signals. The attenuators 204, 214, 224, 234 may be variable and controlled based on power signals received from RF power detectors 203, 213, 223, 233, respectively. The RF power detectors 203, 213, 223, 233 may detect the power of each of the received RF signals. Amplifiers 206, 216, 226, 236 may receive the attenuated filtered RF signals and provide low noise gain to produce amplified RF signals.

Each of the amplified RF signals may be split by 2-way splitters 208, 218, 228, 238, as shown in FIG. 2. For the Ant A and Ant B processing paths, the 2-way splitters 208, 218 split the respective amplified RF signal to 4-way splitters 210, 220, respectively, and to attenuators 209, 219, respectively. The signals sent to the attenuators 209, 219 may be output on ports 102c, 102d when the receiver 100 is in cascade mode through appropriately switching the switches 221, 231.

The amplified signals sent to the 4-way splitters 210, 220 for the Ant A and Ant B processing paths are further split for potential routing to the RF signal processing paths 302a, 302b, 304a, 304b, 306a, 306b, 308a, 308b, depending on the mode of the receiver 100. For the Ant C and Ant D processing paths (in non-cascade mode), the 2-way splitters 228, 238 split the respective amplified RF signal to switches 250, 251, 252, 253 for potential routing to RF signal processing paths 306a, 306b, 308a, 308b, also depending on the mode of the receiver 100.

In particular, the amplified RF signal from the amplifier 206 for Ant A is always routed to RF signal processing paths 302a, 304a (RF Channels 1a, 2a, respectively), and is routed to switches 250, 252 for potential routing to RF signal processing paths 306a, 308a (RF Channels 3a, 4a, respectively). Similarly, the amplified RF signal from the amplifier 216 for Ant B is always routed to RF signal processing paths 302b, 304b (RF channels 1b, 2b, respectively), and is routed to switches 251, 253 for potential routing to RF signal processing paths 306b, 308b (RF Channels 3b, 4b, respectively).

The amplified RF signals from the amplifier 226 for Ant C are routed to switches 250, 252 for potential routing to RF signal processing paths 306a, 308a (RF Channels 3a, 4a, respectively), and the amplified RF signals from the amplifier 236 for Ant D are routed to switches 251, 253 for potential routing to RF signal processing paths 306b, 308b (RF Channels 3b, 4b, respectively). The switches 250, 251, 252, 253 are appropriately switched, depending on the mode of the receiver. In particular, switches 250, 251, 252, 253 may be respectively connected to the 4-way splitters 210, 220 when the receiver is in a cascade mode. In cascade mode, no RF signals are received on the Ant C/Cascade A or Ant D/Cascade B ports. As such, RF signal processing paths 306a, 308a (RF Channels 3a, 4a, respectively) would receive the RF signals received on the Ant A port. RF signal processing paths 306b, 308b (RF channels 3b, 4b, respectively) would receive the RF signals received on the Ant B port.

Figure 3:
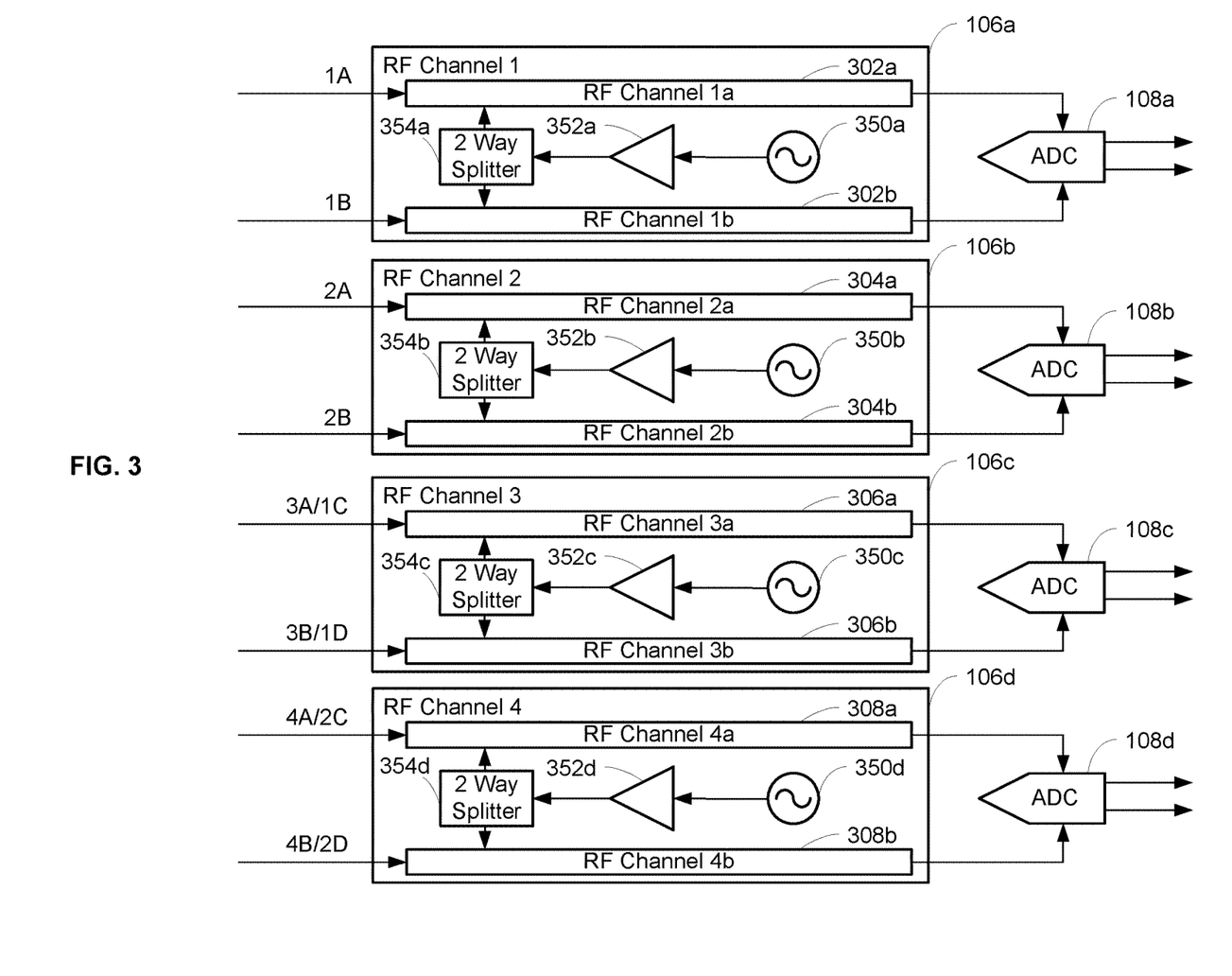
FIG. 3 is a schematic diagram of RF analog processing modules for use in the wireless audio receiver system of FIG. 1, in accordance with some embodiments.

FIG. 3 is a schematic diagram of the RF analog processing modules 106a-d of the wireless receiver 100 of FIG. 1. Each RF analog processing modules 106a-d may include two parallel RF signal processing paths 302a, 302b, 304a, 304b, 306a, 306b, 308a, 308b for processing the routed RF signals from the antenna distribution module 104 to generate analog modulated signals that have been shifted to an intermediate frequency (IF). In particular, RF analog processing module 106a (RF Channel 1) may include RF signal processing paths 302a, 302b (RF Channels 1a, 1b) that always receive RF signals that are routed from RF port 102a (Ant A, as denoted by "1A" from 4-way splitter 210) and from RF port 102b (Ant B, as denoted by "1B" from 4-way splitter 220). Similarly, RF analog processing module 106b (RF Channel 2) may include RF signal processing paths 304a, 304b (RF Channels 2a, 2b) that always receive RF signals that are routed from RF port 102a (Ant A, as denoted by "2A" from 4-way splitter 210) and from RF port 102b (Ant B, as denoted by "2B" from 4-way splitter 220).

The RF signals routed to RF analog processing modules 106c, 106d (RF Channels 3 and 4) may vary, however, depending on the mode of the receiver 100. RF analog processing module 106c (RF Channel 3) may include RF signal processing paths 306a, 306b (RF Channels 3a, 3b) that received RF signals routed through the switches 250, 251, respectively. Switch 250 may route to RF signal processing path 306a (RF Channel 3a) the RF signal from RF port 102a (Ant A, as denoted by "3A" from 4-way splitter 210) or the RF signal from RF port 102c (Ant C, as denoted by "1C" from 2-way splitter 228). Switch 251 may route to RF signal processing path 306b (RF Channel 3b) the RF signal from RF port 102b (Ant B, as denoted by "3B" from 4-way splitter 220) or the RF signal from RF port 102d (Ant D, as denoted by "1D" from 2-way splitter 238). In a similar fashion, switch 252 may route to RF signal processing path 308a (RF Channel 4a) the RF signal from RF port 102a (Ant A, as denoted by "4A" from 4-way splitter 210) or the RF signal from RF port 102c (Ant C, as denoted by "2C" from 2-way splitter 228). Switch 253 may route to RF signal processing path 308b (RF Channel 4b) the RF signal from RF port 102b (Ant B, as denoted by "4B" from 4-way splitter 220) or the RF signal from RF port 102d (Ant D, as denoted by "2D" from 2-way splitter 238).

Each of the RF analog processing modules 106a-d may include a local oscillator (or synthesizer) 350a-d that generates appropriate frequencies to be applied to mixers to shift the frequency of the routed RF signals to the desired IF. The signals generated by the local oscillators 350a-d may be amplified and driven by drivers 352a-d, respectively, then split by 2-way splitters 354a-d, respectively, to be applied to the mixers in the individual RF signal processing paths 302a, 302b, 304a, 304b, 306a, 306b, 308a, 308b. The analog modulated signals at the IF generated by each of the RF signal processing paths 302a, 302b, 304a, 304b, 306a, 306b, 308a, 308b may be converted into digital modulated signals by analog-to-digital converters (ADC) 108a-d. The analog-to-digital converters 108a-d are depicted as dual ADCs that output parallel digital modulated signals, but separate, quad, and/or octal ADCs may also be utilized, for example. The components of the RF signal processing paths 302a, 302b, 304a, 304b, 306a, 306b, 308a, 308b are described in more detail with respect to FIG. 4. It should be noted that while FIG. 3 depicts that the RF signal processing paths 302a, 302b, 304a, 304b, 306a, 306b, 308a, 308bd share respective local oscillator 350a-d, it is contemplated and possible that the RF signal processing paths may be independent, in some embodiments.

Figure 4:
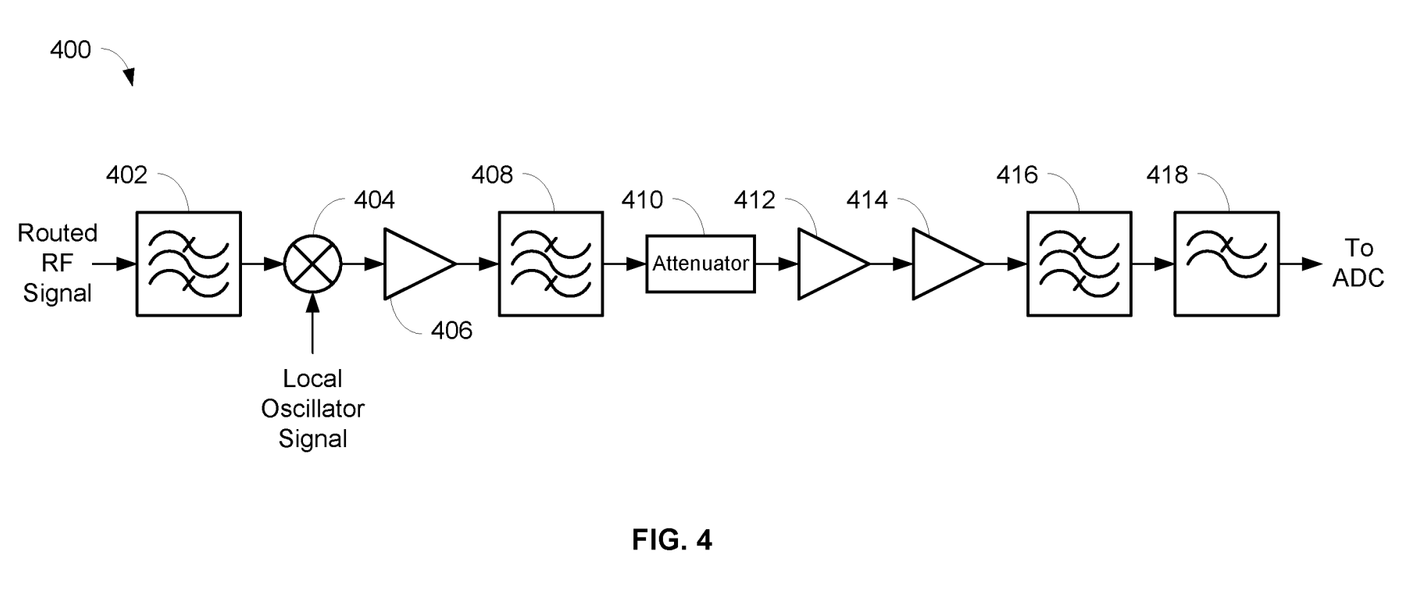
FIG. 4 is a schematic diagram of the components of each of the RF analog processing paths of the RF analog processing modules of FIG. 3, in accordance with some embodiments.

FIG. 4 is a schematic diagram of the components of each of an RF analog processing path 400, which includes RF analog processing paths 302a, 302b, 304a, 304b, 306a, 306b, 308a, 308b of RF analog processing modules 106a-d. An RF signal routed by the antenna distribution module 104 is received by the RF analog processing path 400 and processed to produce an IF signal to be transmitted to analog-to-digital converters 108a-d. In particular, a track tuning filter 402 receives the routed RF signal so that only certain frequencies are passed through to the mixer 404. The mixer 404 may heterodyne the filtered signal generated by the track tuning filter 402 and generate an IF signal based on a local oscillator signal. The mixer 404 may shift the frequency of the filtered signal to a desired IF by applying the signal from one of the local oscillators 350a-d to the filtered signal. The IF signal may then be processed by a low noise amplifier 406, IF filter 408, attenuator 410, amplifiers 412, 414, IF filter 416, and low pass filter 418 to ultimately generate the analog modulated signal at the IF. The IF filters 408, 416 may be surface acoustic wave (SAW) filters, in some embodiments.

Figure 5:
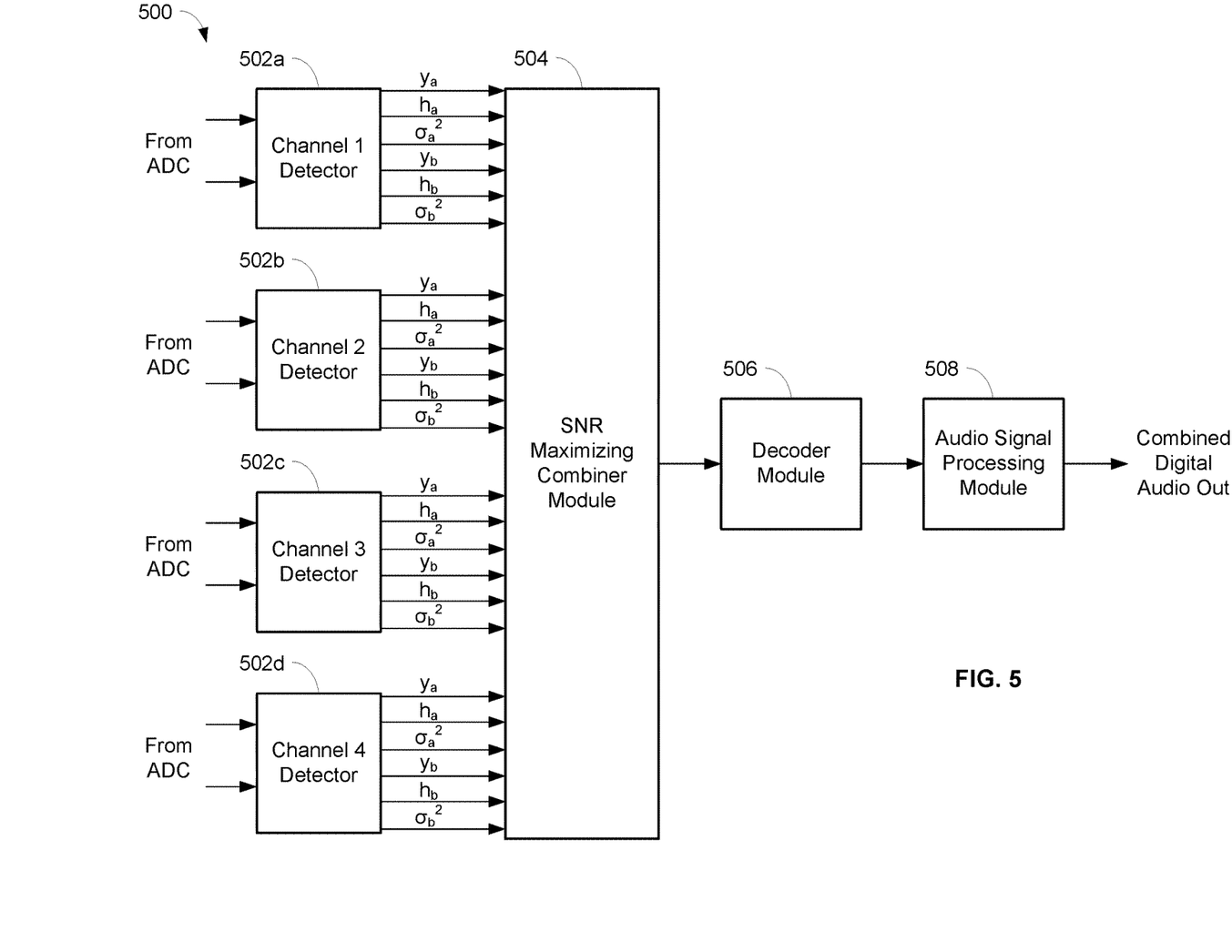
FIG. 5 is a schematic diagram of a digital signal processing module for use in the wireless audio receiver system of FIG. 1, in accordance with some embodiments.

FIG. 5 is a schematic diagram of a digital signal processing (DSP) module 500 for use in the wireless audio receiver 100 of FIG. 1. The DSP module 500 may combine the digital modulated signals from the ADCs 108a-d into a combined modulated signal, based on the signal-to-noise ratios (SNR) of the digital modulated signals. In particular, the digital modulated signals may be scaled proportionally to their respective SNR so that the SNR of the combined modulated signal is maximized. The DSP module 500 may further demodulate the combined modulated signal into a single combined digital audio signal.

Figure 7:
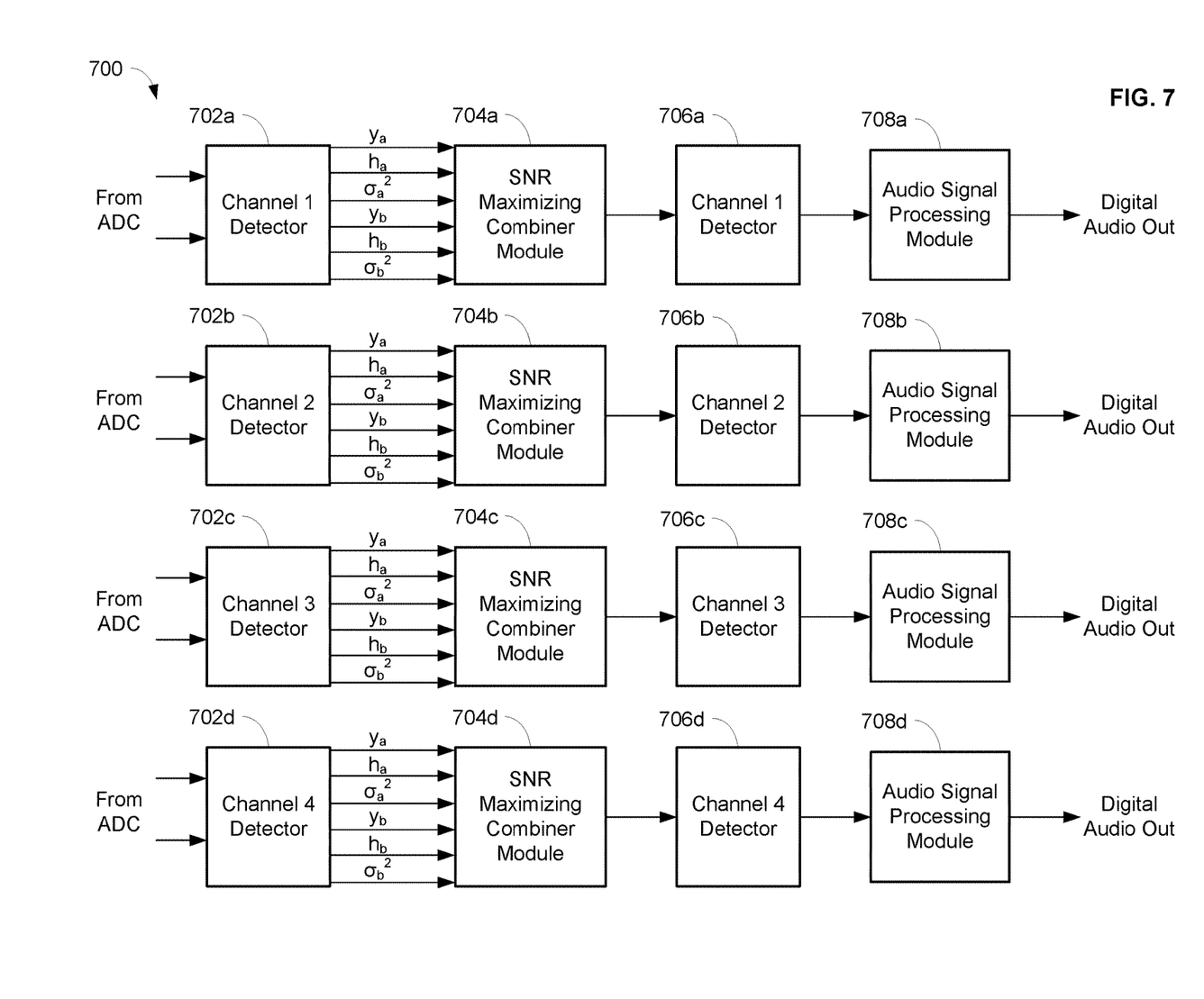
FIG. 7 is a schematic diagram of a digital signal processing module for use in the wireless audio receiver system of FIG. 1, in accordance with some embodiments.

FIG. 7 is a schematic diagram of a digital signal processing (DSP) module 700 for use in the wireless audio receiver 100 of FIG. 1. The DSP module 700 may combine pairs of the digital modulated signals from the ADCs 108*a-d* into four combined modulated signals, based on the signal-to-noise ratios (SNR) of the digital modulated signals. In particular, the digital modulated signals may be scaled proportionally to their respective SNR so that the SNR of the four combined modulated signals are maximized. The DSP module 500 may further demodulate each of the four combined modulated signals into four digital audio signals.

Figure 6:
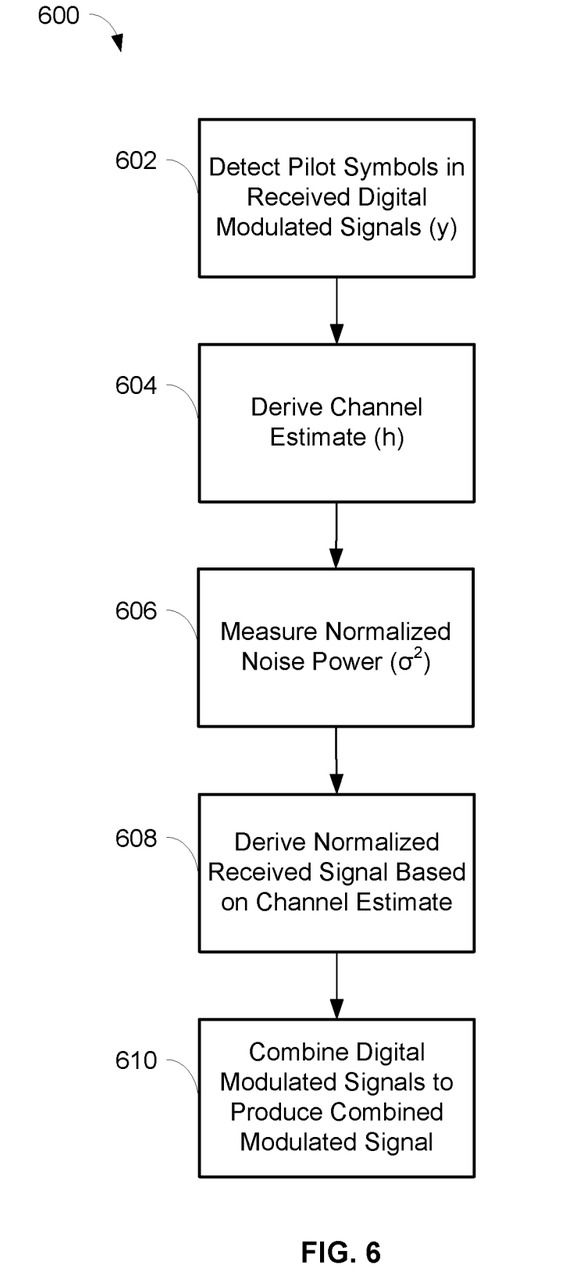
FIG. 6 is a flowchart illustrating operations for combining multiple digital modulated signals into a single combined signal using the wireless audio receiver system of FIG. 1, in accordance with some embodiments.

A process 600 that may perform the combining of the digital modulated signals using the DSP modules 500 and 700 is shown in FIG. 6. The digital modulated signals from the ADCs 108*a-d* may be received by detectors 502*a-d* or 702*a-d*, respectively. In some embodiments, the detectors 502*a-d* and 702*a-d* may measure the normalized noise power of each digital modulated signal (i.e., the noise power relative to unity RMS signal power) by detecting the degree to which pilot symbols embedded in the digital modulated signals are perturbed from their known locations. As such, the detectors 502*a-d* and 702*a-d* may detect pilot symbols in the received digital modulated signal (y), such as at step 602 of the process 600 shown in FIG. 6. The pilot symbols may have been embedded in the digital modulated signals by the wireless transmitter. In some embodiments, the pilot symbols may be QPSK symbols arranged in three symbol blocks, occurring approximately every 125 microseconds. The grouping and the rate of the pilot symbols may depend on various signal propagation characteristics. For example, very slow fading may allow the rate of the pilot symbols to be lesser.

A channel estimate (h) of the digital modulated signals may be derived, such as at step 604. The channel estimate may be derived based on the detected pilot symbols, in some embodiments. Next, the normalized noise power ($\sigma^2$) of each of the digital modulated signals may be measured, such as at step 606 of the process 600. In some embodiments, the normalized noise power may be measured based on the detected pilot symbols. A normalized received signal may be derived based on the detected channel estimate, such as at step 608. In the case of the embodiment shown in FIG. 5, a combined modulated signal may be generated by an SNR maximizing combiner module 504, such as at step 610, based on the normalized noise power and the normalized received signal. For the embodiment shown in FIG. 7, four combined modulated signals may be generated by respective SNR maximizing combiner modules 704*a-d*, such as at step 610, based on the normalized noise power and the normalized received signal. In some embodiments, the combined modulated signal ($\hat{x}$) may be generated based on the equation $$\hat{x} = \frac{\sum_{i=0}^{L-1} \frac{h_i^* y_i}{|h_i|^2} \frac{1}{\sigma_{N_i}^2}}{\sum_{i=0}^{L-1} \frac{1}{\sigma_{N_i}^2}},$$

where L is the number of digital modulated signals, $\sigma_N^2$, is the normalized noise variance/power for input i, $h_i$ is the channel estimate for input i, and $y_i$ is the received signal for input i.

In the case of the embodiment shown in FIG. 5, the combined modulated signal may be demodulated by a decoder module 506 to generate a combined demodulated signal. The combined demodulated signal may be further processed by an audio signal processing module 508 to generate a combined digital audio signal. In the case of the embodiment shown in FIG. 7, the four combined modulated signals may be respectively demodulated by separate decoder modules 706*a-d* to generate four demodulated signals. The four demodulated signals may each be further processed by audio signal processing modules 708*a-d* to generate four digital audio signals. The audio signal processing modules 508, 708*a-d* may perform, for example, filtering, gain, metering, and/or signal limiting on the combined demodulated signal. The combined digital audio signal (or separate digital audio signals) may be output by the receiver 100, and/or DACs 112*a-d* may convert the combined digital audio signal (or separate digital audio signals) to a combined analog audio signal (or separate analog audio signals).

It should be noted that FIGS. 3-7 are exemplary of possible downstream processing modules and methods for processing the received RF signals, and that other schemes and methods of processing received RF signals are possible. For example, the RF signals may contain analog modulated audio signals such that the downstream processing modules may include analog demodulation modules and the like. As another example, the RF signals may be directly sampled by downstream processing modules.

Any process descriptions or blocks in figures should be understood as representing modules, segments, or portions of code which include one or more executable instructions for implementing specific logical functions or steps in the process, and alternate implementations are included within the scope of the embodiments of the invention in which functions may be executed out of order from that shown or discussed, including substantially concurrently or in reverse order, depending on the functionality involved, as would be understood by those having ordinary skill in the art.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A wireless audio receiver, comprising:
   (A) a mode selection interface for enabling a user to select one of a plurality of modes of the wireless audio receiver;

(B) a plurality of radio frequency (RF) ports each configured to receive a plurality of RF signals from a respective antenna, wherein each of the plurality of RF signals comprises one or more audio signals;

(C) an antenna distribution module in communication with the plurality of RF ports, wherein the antenna distribution module is configured to:
- when in a first mode, route the plurality of RF signals to one or more RF analog processing modules in communication with the antenna distribution module, wherein the one or more RF analog processing modules are configured to process the routed RF signals at a particular frequency to generate one or more analog modulated signals at an intermediate frequency; and
- when in a second mode, route a first subset of the plurality of RF signals to be output on a first subset of the plurality of RF ports and route a second subset of the plurality of RF signals to the one or more RF analog processing modules;

(D) one or more analog-to-digital converters (ADC) in communication with the one or more RF analog processing modules, wherein the one or more ADCs are configured to convert the one or more analog modulated signals to one or more digital modulated signals; and (E) a digital signal processing (DSP) module in communication with the one or more ADCs, the DSP module configured to demodulate the one or more digital modulated signals to one or more digital audio signals.

2. The wireless audio receiver of claim 1, wherein the DSP module is further configured to demodulate and combine the one or more digital modulated signals to a combined digital demodulated signal.

3. The wireless audio receiver of claim 2, wherein the DSP module is configured to demodulate and combine the one or more digital modulated signals to the combined digital demodulated signal based on a signal-to-noise ratio (SNR) of the one or more digital modulated signals.

4. The wireless audio receiver of claim 3, wherein the DSP module comprises:
- one or more detectors configured to receive the one or more digital modulated signals (y), wherein the one or more detectors are configured to:
  - derive a channel estimate (h) of the one or more digital modulated signals;
  - measure a normalized noise power ($\sigma^2$) of the one or more digital modulated signals; and
  - derive a normalized received signal based on the channel estimate; and
- a SNR maximizing combiner module configured to combine the one or more digital modulated signals to produce a combined modulated signal based on the normalized noise power and the normalized received signal.

5. The wireless audio receiver of claim 4, wherein the one or more detectors are further configured to:
- detect one or more pilot symbols in the one or more digital modulated signals;
- derive the channel estimate by deriving the channel estimate of the one or more digital modulated signals based on the detected pilot symbols; and
- measure the normalized noise power by measuring the normalized noise power of the one or more digital modulated signals based on the detected pilot symbols.

6. The wireless audio receiver of claim 4, wherein the DSP module further comprises:
- a decoder configured to demodulate the combined modulated signal to a combined demodulated signal; and
- an audio processing module configured to process the combined demodulated signal to a combined digital audio signal.

7. The wireless audio receiver of claim 1, wherein the DSP module further comprises:
- one or more decoders configured to demodulate the one or more digital modulated signals to one or more demodulated signals; and
- one or more audio processing modules configured to process the one or more demodulated signals to the one or more digital audio signals.

8. A method of operating a wireless audio receiver, comprising:

(A) receiving a selection of one of a plurality of modes of the wireless audio receiver from a mode selection interface;

(B) receiving a plurality of RF signals at a plurality of radio frequency (RF) ports from a respective antenna, wherein each of the plurality of RF signals comprises one or more audio signals;

(C) when in a first mode:
- routing the plurality of RF signals with an antenna distribution module to one or more RF analog processing modules in communication with the antenna distribution module; and
- processing the routed RF signals with the one or more RF analog processing modules at a particular frequency to generate one or more analog modulated signals at an intermediate frequency;

(D) when in a second mode:
- routing a first subset of the plurality of RF signals with the antenna distribution module to be output on a first subset of the plurality of RF ports; and
- routing a second subset of the plurality of RF signals with the antenna distribution module to the one or more RF analog processing modules;

(E) converting the one or more analog modulated signals to one or more digital modulated signals with one or more analog-to-digital converters (ADC) in communication with the one or more RF analog processing modules; and (F) demodulating the one or more digital modulated signals to one or more digital audio signals with a digital signal processing (DSP) module in communication with the one or more ADCs.

9. The method of claim 8, further comprising demodulating and combining the one or more digital modulated signals to a combined digital demodulated signal with the DSP module.

10. The method of claim 9, wherein demodulating and combining the one or more digital modulated signals to the combined digital demodulated signal is based on a signal-to-noise ratio (SNR) of the one or more digital modulated signals.

11. The method of claim 10, further comprising:
- receiving the one or more digital modulated signals (y) at one or more detectors of the DSP module;
- deriving a channel estimate (h) of the one or more digital modulated signals with the one or more detectors;
- measuring a normalized noise power ($\sigma^2$) of the one or more digital modulated signals with the one or more detectors;
- deriving a normalized received signal based on the channel estimate with the one or more detectors; and combining the one or more digital modulated signals with a SNR maximizing combiner module of the DSP module to produce a combined modulated signal based on the normalized noise power and the normalized received signal.

12. The method of claim 11, further comprising:

detecting one or more pilot symbols in the one or more digital modulated signals with the one or more detectors;

deriving the channel estimate with the one or more detectors by deriving the channel estimate of the one or more digital modulated signals based on the detected pilot symbols; and measuring the normalized noise power with the one or more detectors by measuring the normalized noise power of the one or more digital modulated signals based on the detected pilot symbols.

13. The method of claim 11, further comprising:

demodulating the combined modulated signal to a combined demodulated signal with a decoder of the DSP module; and processing the combined demodulated signal to a combined digital audio signal with an audio processing module of the DSP module.

14. The method of claim 8, further comprising:

demodulating the one or more digital modulated signals to one or more demodulated signals with one or more decoders of the DSP module; and processing the one or more demodulated signals to the one or more digital audio signals with one or more audio processing modules of the DSP module.

* * * * *